United States Patent Office 2,776,283
Patented Jan. 1, 1957

2,776,283

5-DIALKYLAMINOMETHYL AND 5-HETEROCY-CLYLMETHYL SUBSTITUTED 2-AMINO-6-ARYL-4-PYRIMIDOL DERIVATIVES

Kurt J. Rorig, Evanston, Ill., assignor, by mesne assignments, to G. D. Searle & Co., Skokie, Ill., a corporation of Delaware No Drawing. Application June 1, 1954, Serial No. 433,810

12 Claims. (Cl. 260—247.5)

My invention relates to a new group of heterocyclic compounds and, more specifically, to 5-dialkylaminomethyl and 5-heterocyclylmethyl substituted 2-amino-6-aryl-4-pyrimidols, their salts and to their preparation.

The compounds which constitute my invention can be represented by the general structural formula

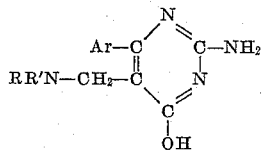

wherein Ar is an aryl radical and RR'N is either a lower dialkylamino or a nitrogen-containing heterocyclic radical attached to the adjoining methylene radical through a nitrogen in the heterocycle.

In the foregoing structural formula the radical Ar represents an aryl radical and preferably an aryl hydrocarbon radical containing 6 to 9 carbon atoms, i. e. a phenyl or a lower alkylated phenyl radical such as tolyl, xylyl, cumyl, trimethylphenyl, and the like. The radicals R and R' can represent such lower alkyl radicals as methyl, ethyl, straight-chain and branched propyl, butyl, amyl, and hexyl. The radical RR'N can also constitute a nitrogen-containing heterocyclic radical attached through the nitrogen in the heterocycle to the adjoining methylene radical. Examples are N-morpholino, N-pyrrolidino, and N-piperidino ring systems.

The compounds of my invention are prepared by a process which comprises the condensation of a compound of the structural formula

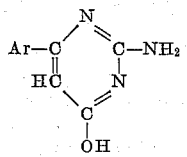

with one equivalent of an acid addition salt of an amine of the formula RR'N and formaldehyde. Preferred acid addition salts are the hydrohalides. The reaction is conveniently carried out by heating the reactants in a solvent such as a lower alkanol while maintaining the pH at about 7 or slightly below by periodic addition of alcoholic hydrogen halide. As a result of this condensation the monohydrohalide is usually obtained as a solid precipitate. The free base is obtained in the usual manner by alkalinization of a solution or suspension of the acid addition salt.

The compounds of my invention readily form salts with one equivalent of a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnamic, and related acids. They also form quaternary ammonium salts with a variety of organic esters of sulfuric, hydrohalic, and aromatic sulfonic acids. Among such esters are methyl chloride, methyl bromide, methyl iodide, the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, the propylene halohydrins, allyl chloride, methallyl bromide, and crotyl bromide. Under more forcing conditions both of the basic nitrogen atoms add an equivalent of acid. For example, treatment of an alcoholic suspension of a mono-acid addition salt with an anhydrous hydrogen halide leads to formation of the di-acid addition salt.

The compounds of my invention have valuable diuretic, cardioregulatory and hypotensive properties. They are also valuable as intermediates in the synthesis of other medicinal compounds. This quaternization leads to active anticholinergic agents.

My invention is disclosed in further detail by the following examples which present specific embodiments of my invention without, however, limiting it in spirit or in scope. In the examples quantities of materials are given in parts by weight.

*Example 1*

Under anhydrous conditions a solution of 192 parts of the ethyl ester of benzoylacetic acid and 94 parts of guanidine carbonate in 800 parts of ethanol is stirred and refluxed for 12 hours. The reaction mixture is then cooled and treated with solid carbon dioxide. The precipitated 2-amino-6-phenyl-4-pyrimidol is collected on a filter, washed with a small amount of ice-cold ethanol, and dried. Recrystallized from dimethylformamide, the compound melts at about 310–311° C. with decomposition.

A suspension of 375 parts of 2-amino-6-phenyl-4-pyrimidol in 4000 parts of ethanol is heated to reflux and then treated with a sufficient amount of alcoholic hydrogen chloride to lower the pH below 7. Then 164 parts of dimethylamine hydrochloride and 90 parts of paraformaldehyde are added. The mixture is refluxed for 75 minutes with periodic addition of alcoholic hydrogen chloride in a sufficient quantity to maintain the pH below 7. Then 100 parts of a 36% aqueous formaldehyde solution are added and refluxing is continued for 6 hours with periodic addition of alcoholic hydrogen chloride to maintain the pH between 6 and 7. Finally the mixture is chilled and the solid precipitate is collected on a filter. The monohydrochloride of 2-amino-5-dimethylaminomethyl-6-phenyl-4-pyrimidol thus obtained melts at about 267–277° C.

To a suspension of this monohydrochloride in ethanol an excess of dry hydrogen chloride is added. The suspension is then heated to 80° C. and filtered. Upon cooling the filtrate deposits white crystals which are collected on the filter and dried. The dihydrochloride of 2 - amino - 5-dimethylaminomethyl-6-phenyl-4-pyrimidol thus obtained melts at about 280–283° C. with decomposition. The salt has the structural formula

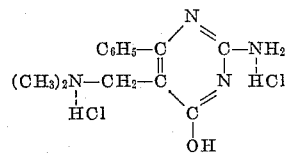

*Example 2*

To a stirred solution of 73 parts of diethylamine in 2000 parts of ethanol a sufficient amount of an 18% solution of anhydrous hydrogen chloride in ethanol is slowly added to lower the pH below 7 in order to form diethylamine hydrochloride. After addition of 163 parts of 2-amino-6-phenyl-4-pyrimidol and 95 parts of paraformaldehyde the mixture is stirred and heated at reflux for 18 hours during which time small portions of ethanolic hydrogen chloride are added in order to keep the mixture neutral or slightly acid. Then the reaction mixture is chilled and the solid material is collected on a filter and slurried in cold ethanol to wash out impurities. The hydrochloride of 2-amino-5-diethylaminomethyl-6-phenyl-4-pyrimidol thus obtained sinters at about 247° C. and melts with decomposition at about 255° C.

*Example 3*

A solution of 87 parts of freshly distilled morpholine in 2000 parts of ethanol is treated with a sufficient amount of an 18% ethanolic hydrogen chloride solution to lower the pH slightly below 7. Then 163 parts of 2-amino-6-phenyl-4-pyrimidol and 95 parts of paraformaldehyde are added and the mixture is refluxed for 15 hours during which time the pH is maintained in a range between 6 and 7 by gradual addition of ethanolic hydrogen chloride. Upon chilling a solid precipitate forms which is collected on a filter and slurried in cold ethanol. The hydrochloride of 2-amino-5-morpholinomethyl-6-phenyl-4-pyrimidol sinters at about 220° C. and melts at about 235-250° C. The base has the structural formula

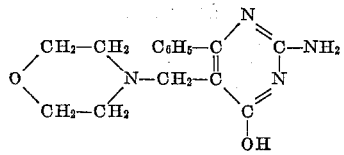

*Example 4*

To a stirred solution of 85 parts of piperidine in 2000 parts of ethanol an 18% solution of hydrogen chloride in ethanol is slowly added until the solution is slightly acid. Then 163 parts of 2-amino-6-phenyl-4-pyrimidol and 95 parts of paraformaldehyde are added and the reaction mixture is stirred and refluxed for 18 hours while the pH is maintained between 6 and 7 by periodic addition of ethanolic hydrogen chloride. On chilling a solid precipitate is obtained which is collected on a filter, slurried in cold ethanol and dried. Upon heating the hydrochloride of 2-amino-5-piperidinomethyl-6-phenyl-4-pyrimidol sinters at about 243° C., melts with decomposition at about 256-258° C., and becomes completely liquid at 275° C. The base has the structural formula

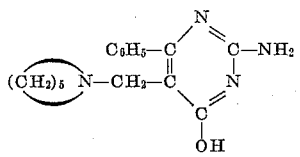

*Example 5*

A mixture of 234 parts of the ethyl ester of 2,4,6-trimethylbenzoylacetic acid, 94 parts of guanidine carbonate and 1000 parts of ethanol is stirred and heated at reflux temperature for 12 hours and then chilled and treated with solid carbon dioxide. A precipitate forms which is collected on a filter. The mother liquor is evaporated under vacuum to about one-third of its original volume and then diluted with 1500 parts of water. Upon cooling an additional yield of the 2-amino-6-(2',4',6'-trimethylphenyl)-4-pyrimidol is obtained.

A suspension of 458 parts of this product in 5000 parts of ethanol is heated to reflux and treated with a sufficient amount of alcoholic hydrogen chloride to lower the pH below 7. Then 235 parts of the hydrochloride of pyrrolidine and 190 parts of paraformaldehyde are added and the mixture is stirred under reflux for 8 hours with periodic addition of alcoholic hydrogen chloride to maintain the pH between 6 and 7. After chilling the solid precipitate of the monohydrochloride of 2-amino-5-pyrrolidinomethyl-6-(2',4',6'-trimethylphenyl)-4-pyrimidol is obtained. This compound does not give a sharp melting point but decomposes above 280° C. The free base is obtained by treatment of an aqueous solution of the hydrochloride with one equivalent of dilute ammonium hydroxide, and filtration of the solid free base. The compound thus obtained has the structural formula

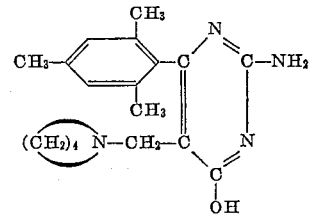

I claim:
1. The process of preparing a compound of the structural formula

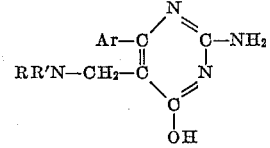

wherein Ar is an aryl hydrocarbon radical containing 6-9 carbon atoms and RR'N is a member of the class consisting of di-(lower)alkylamino, morpholino, pyrrolidino, and piperidino radicals which comprises the condensation of a compound of the structural formula

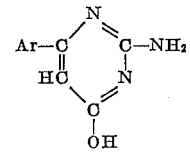

with one equivalent of an acid addition salt of an amine of the formula RR'NH and formaldehyde.

2. The process of preparing a 2-amino-5-[di-(lower)-alkylamino]-methyl-6-phenyl-4-pyrimidol which comprises the condensation of 2-amino-6-phenyl-4-pyrimidol with one equivalent of an acid addition salt of a lower dialkylamine and formaldehyde.

3. The process of preparing 2-amino-5-dimethylaminomethyl-6-phenyl-4-pyrimidol which comprises the condensation of 2-amino-6-phenyl-4-pyrimidol with a dimethylamine hydrohalide and formaldehyde.

4. The process of preparing 2-amino-5-diethylaminomethyl-6-phenyl-4-pyrimidol which comprises the condensation of 2-amino-6-phenyl-4-pyrimidol with a diethylamine hydrohalide and formaldehyde.

5. The process of preparing 2-amino-5-morpholinomethyl-6-phenyl-4-pyrimidol which comprises the condensation of 2-amino-6-phenyl-4-pyrimidol with a morpholine hydrohalide and formaldehyde.

6. The process of preparing 2-amino-5-piperidinomethyl-6-phenyl-4-pyrimidol which comprises the condensation of 2-amino-6-phenyl-4-pyrimidol with a piperidine hydrohalide and formaldehyde.

7. A compound of the structural formula

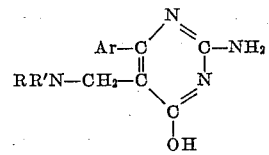

wherein Ar is an aryl hydrocarbon radical containing 6-9 carbon atoms and RR'N is a member of the class consisting of di-(lower)alkylamino, morpholino, pyrrolidino, and piperidino radicals.

8. A 2-amino-5-[di-(lower)alkylamino]methyl-6-phenyl-4-pyrimidol.

9. 2-Amino-5-dimethylaminomethyl-6-phenyl-4-pyrimidol.

10. 2-Amino-5-diethylaminoethyl-6-phenyl-4-pyrimidol.

11. 2-Amino-5-morpholinomethyl-6-phenyl-4-pyrimidol.

12. 2-Amino-5-piperidinomethyl-6-phenyl-4-pyrimidol.

References Cited in the file of this patent
UNITED STATES PATENTS 2,624,732  Hitchings _____ Jan. 6, 1953

OTHER REFERENCES

Falco et al.: JACS, vol. 73, pp. 3758–62 (1951).